F. C. WEGNER.
POULTRY ROOST.
APPLICATION FILED APR. 27, 1921.
1,391,596.
Patented Sept. 20, 1921.
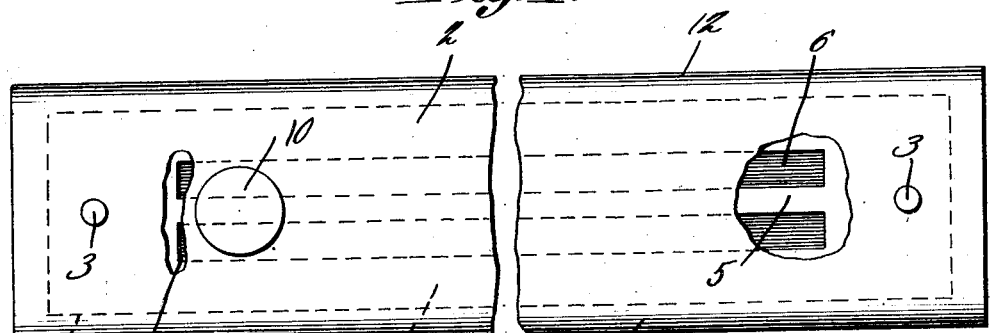
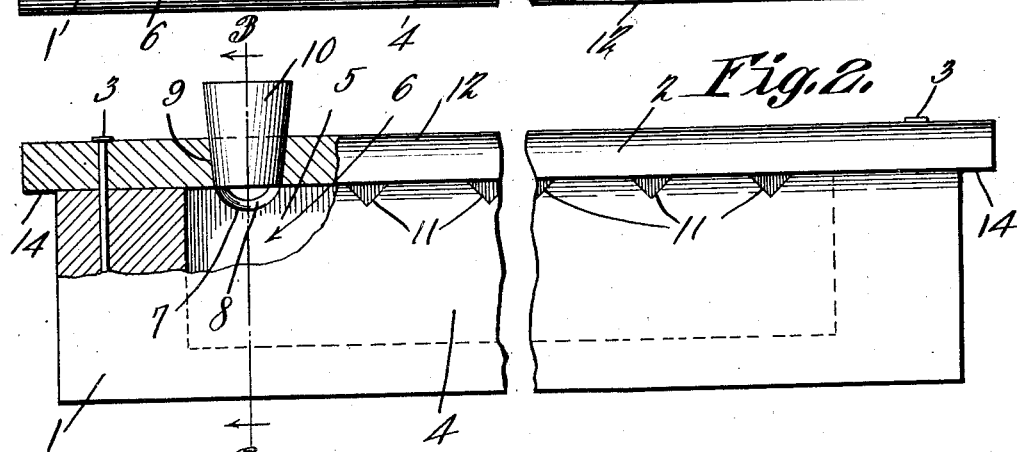
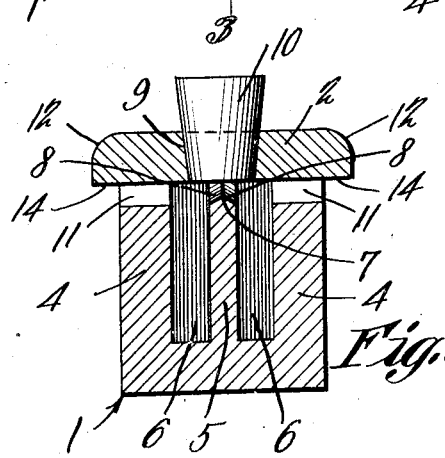
Inventor,
F. C. Wegner.
By C. A. Snow & Co.
Attorney

UNITED STATES PATENT OFFICE.

FRED C. WEGNER, OF ARCHER, NEBRASKA.

POULTRY ROOST.

1,391,596.　　　　　Specification of Letters Patent.　　Patented Sept. 20, 1921.

Application filed April 27, 1921. Serial No. 464,919.

*To all whom it may concern:*

Be it known that I, FRED C. WEGNER, a citizen of the United States, residing at Archer, in the county of Merrick and State of Nebraska, have invented a new and useful Poultry-Roost, of which the following is a specification.

The device forming the subject matter of this application is a poultry roost or perch, and one object of the invention is to provide novel means whereby a liquid insecticide in the body of the perch will be carried upwardly by capillary attraction, and be caused to spread over the lid portion of the perch.

Another object of the invention is to provide novel means whereby the liquid insecticide may be inserted into and distributed fairly between the compartments of the body.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a perch constructed in accordance with the invention, parts being broken away; Fig. 2 is a side elevation wherein parts are broken away; Fig. 3 is a cross section taken on the line 3—3 of Fig. 2.

In carrying out the invention there is provided a body 1 in the form of a bar, preferably made of wood, and surmounted by a lid 2, likewise made of wood, the lid being held on the body by securing elements 3, located adjacent to the ends of the body or elsewhere. The lid 2 may project, as indicated at 14, beyond the sides and the ends of the body 1 and may be rounded as shown at 12, to give the fowls a better hold on the perch, although this detail is not insisted upon.

The body 1 includes outer walls 4 and an inner wall 5, defining compartments 6 adapted to receive a liquid insecticide. In the upper end of the inner wall 5, a notch 7 is fashioned, the notch being defined by oppositely slanting surfaces 8. There is an opening 9 in the lid 2, above the notch 7. Liquid insecticide is inserted by way of the opening 9, and the oppositely slanting surfaces 8 of the notch 7 serve to distribute the liquid insecticide fairly between the compartments 6. The opening 9 may be stopped by a closure 10 of any desired sort, such as a cork. If desired, notches 11 may be formed in the upper edges of the outer walls 4, immediately beneath the lid 2. If the insecticide is of the fuming variety, the notches 11 permit the fumes to pass outwardly. If the insecticide is volatile, the notches 11 admit air to the insecticide. It is possible, if desired, to fill the compartments 6 until the liquid runs outwardly through the notches 11 and coats the outer surfaces of the walls 4.

Owing to the fact that the body 1 and the lid 2 are fashioned from wood, the insecticide will rise, by capillary attraction, along the inner surfaces of the walls 4 and 5, and will spread, by capillary attraction, over the lid 2. This is an important feature, as will be obvious to those skilled in the art.

The wall or partition 5 exercises a two-fold office. First, it acts as a wick facilitating the capillary distribution of the insecticide on the lid 2. Second, should one of the outer walls 4 split or check, thereby permitting the insecticide to run out of one of the compartments 6, the inner wall 5 may remain intact, thereby holding the insecticide in the other compartment.

I claim:—

1. A poultry perch comprising a body and a lid secured to the body, the body having walls defining a compartment for the reception of a liquid insecticide, the body and the lid being of wood, whereby the insecticide will ascend the walls by capillary attraction and spread by capillary attraction upon the lid, the body including an inner wall, separating the compartment into parts and acting as a wick, facilitating the distribution of the insecticide by capillary attraction.

2. A poultry perch comprising a body having outer walls and an inner wall, the walls defining compartments; and a lid on the body, the lid having a filling opening discharging upon the inner wall.

3. A poultry perch constructed as set forth in claim 2 and further characterized by the fact that the inner wall has a notch, located directly below the filling opening and defined by oppositely slanting surfaces, effecting an even distribution of the insecticide between the compartments.

4. A poultry perch constructed as set forth in claim 2 and further characterized by the fact that the outer walls are provided with notches located immediately beneath the lid, the inner wall having a notch located directly below the filling opening.

In testimony that I claim the foregoing as my own, I have hereto affixed my signature in the presence of two witnesses.

FRED C. WEGNER.

Witnesses:
 GEO. ECKHOFF,
 W. P. HANSEN.